United States Patent Office 3,074,533
Patented Jan. 22, 1963

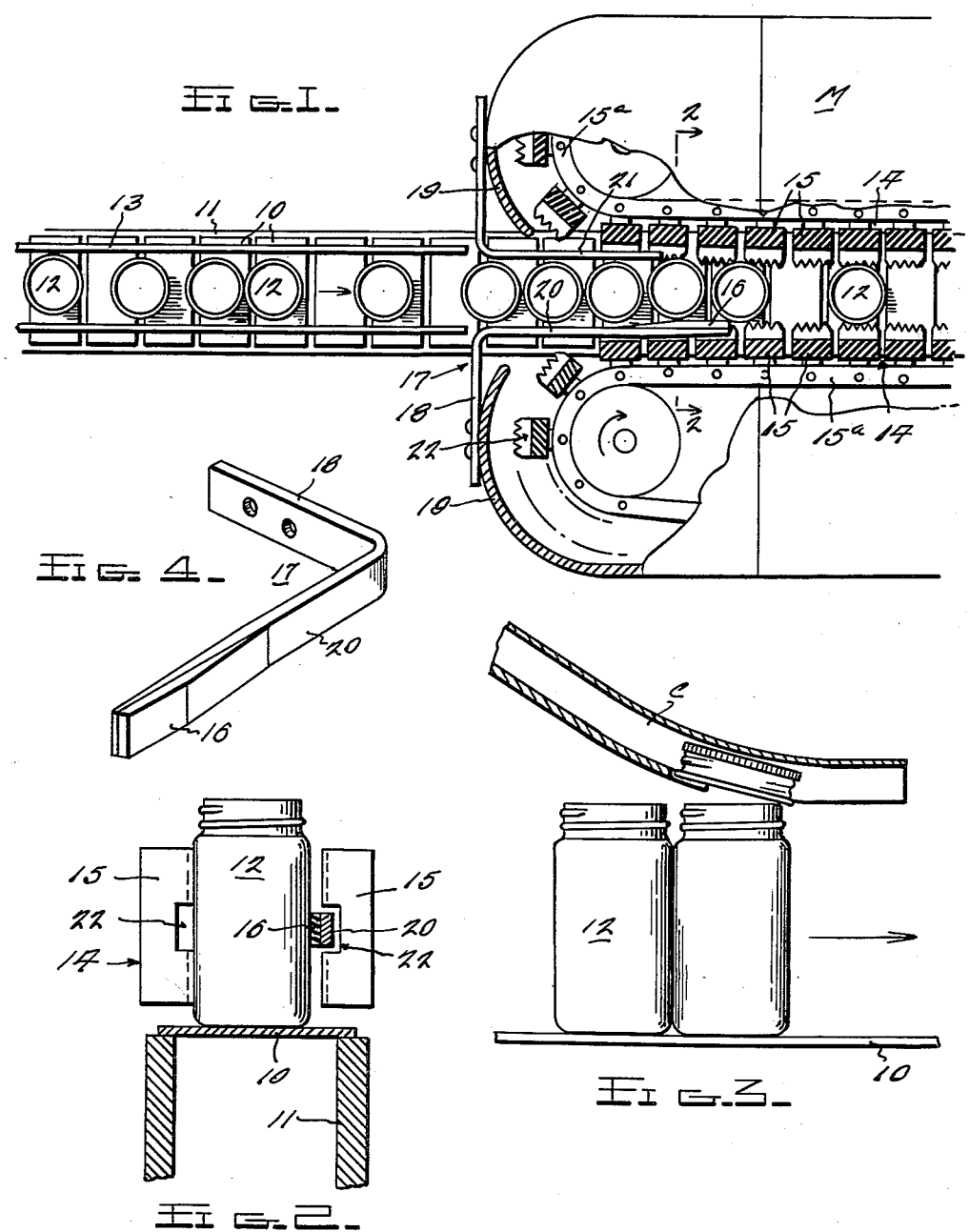

3,074,533
CONTAINER HANDLING APPARATUS
Eric O. Ninneman and George D. Armbruster, Toledo, Ohio, assignors to Owens-Illinois Glass Company, a corporation of Ohio
Filed Feb. 28, 1961, Ser. No. 92,221
8 Claims. (Cl. 198—34)

Our invention relates to improvements in container handling apparatus.

An important object of our invention is the provision of simple, completely reliable means for spacing containers, such as round glass jars, apart, just prior to their entering a capping or container sealing machine, to the end that they may properly pick up closure caps at the entrance point to such machine.

Many round jars, for example, are so designed that the closure cap receiving neck is of about the same external diameter as the body portion. With containers of such design being delivered seriatim and in side to side contact with each other, to a closure cap pick-up station (passing beneath the discharge end of a closure cap chute) it is apparent the lack of space between the necks of adjacent containers would preclude initial closure cap placement. There would be no space to accommodate the closure cap attaching skirt. An example of such conditions and disclosure of a closing machine with which our invention may well be and in fact is being used commercially, is shown in Harmon and Hohl, U.S. Patent Number 2,855,736, issued October 14, 1958. Thus the absolute necessity for spacing such jars apart at the closure cap receiving or pick-up station is apparent. There are many other situations requiring such spacing. Where, for example, jars are moving continuously beneath an adhesive applying roller which functions to deposit a film of adhesive upon the top sealing surface for later bond with an inner seal, it is apparent that if the jars are in abutting side to side relationship and vary in height, from time to time, the roller will not contact the entire top surface of every container. As a necessary consequence, hermetic sealing of the liner to the container will not be effected.

Our invention, therefore, has as its primary objective the provision of effective means for overcoming the above indicated deficiencies and insuring the spacing apart of jars and the like containers preparatory to being capped or worked upon in a preselected zone.

Other objects will be in part apparent and in part pointed out hereinafter.

In the accompanying drawings forming a part of our application:

FIG. 1 is a fragmentary sectional plan view showing our invention embodied in a jar handling machine, which may be of the general construction illustrated in the Harmon et al. patent above identified.

FIG. 2 is a fragmentary cross-sectional view taken substantially at the plane of line 2—2 of FIG. 1.

FIG. 3 is a fragmentary side elevational view showing two abutting jars at a closure cap pick-up station indicating the need and importance of spacing the jars apart at this station.

FIG. 4 is a perspective view of our invention.

Our invention is illustrated in conjunction with a machine M comprising an endless horizontal conveyor 10 mounted upon a frame 11, said conveyor being driven and advanced continuously by a motor (not shown) and functioning to carry generally cylindrical containers 12, such as glass jars, to and through closure cap pick-up and affixing zones. Side rails 13 limit possible lateral movement of the jars on the conveyor. Jars entering the machine M are steadied, or stabilized, against tipping by means of opposed side grippers 14, such comprising an endless series of pads 15 of rubber-like material, each having a serrated jar contacting face. These pads are carried by endless belts 15ª or perhaps sprocket chains, one series of pads being positioned at each side of the horizontal conveyor 10 and by means (not shown) being advanced with and at the same lineal speed as said conveyor. As brought out above, spacing the jars apart lengthwise of the conveyor prior to arrival at a closure cap pick-up station (FIG. 3) at the bottom end of a cap chute C or perhaps passing beneath and adhesive applicator roll (not shown), is of real importance.

Accordingly, our invention provides means for momentarily breaking engagement between the containers one at a time and one of the side grippers 14 for a short distance just in advance of arrival at a cap pick-up station or zone, or at an adhesive applying station. Thus, for a short period of time and travel, as perhaps will be more evident presently, each jar 12 is no longer advanced with and at the speed of the two belts, but instead rotates about its own axis and rolls along its path under influence of one contacting belt only and with its normal advancing speed reduced fifty percent (50%). As a consequence, such jar, while traveling at a reduced speed because it is not contacting both belts, holds back any succeeding contacting jars, while the preceding jar engages both side grippers 14 and immediately resumes its initial speed, such being the maximum speed of the belts. The result is immediate spacing apart of the lead jar from those following, as indicated in FIG. 1, extreme right hand side.

Specifically, our invention comprises a cam 16 formed of a rubber-like friction material supported upon the forward free end of an L-shaped bracket 17. This bracket 17 has a base 18 riveted or otherwise secured to the machine housing 19. The arm 20, which directly supports the cam, is laterally resilient and extends along one side of the path of the jars in such position relative to the path of travel of the adjacent series of grippers 14 as to momentarily hold passing jars out of contact with these specific grippers. Thus the jars, under the influence of the other or opposed series of grippers, are rotated about their axes and in effect roll along the working face of the cam. The frictional engagement between each jar and the rubber-faced cam is sufficiently effective to preclude any appreciable slippage therebetween.

Directly opposite the cam-carrying bracket 17 is a side guide rail 21 which is attached to the machine housing 19. This rail is arranged parallel with the cam carrying arm 20 of the bracket 17, both being disposed horizontally along the conveyor 10 and serving to guide jars into the receiving end of the machine. The side rail 21 terminates short of the cam carrying part of the bracket 17 so that the cam is free to shift jars transversely away from and out of contact with the adjacent grippers 14 into firm engagement with the opposed grippers. It will also be observed that each of the gripper pads 15 has a channel 22 or groove to accommodate the bracket 17 and guide rail 21.

Briefly, the operation involves advancing jars, or similar cylindrical containers along the conveyor 10. They may be randomly arranged as in FIG. 1, some being in side to side contact with each other and others relatively isolated. As each jar rides along the conveyor against the cam carrying bracket 17, it quickly engages the cam 16, such immediately moving the jar bodily away from the adjacent grippers 14. The opposed series of grippers thereupon positively engage and rotate the jar about its axis and roll it along the cam working surface, but at one-half the speed of travel of jars which have advanced beyond the influence of the cam and now are engaged by both series of grippers. Succeeding jaws will, of course, be held back, as indicated.

Modifications may be resorted to within the spirit and scope of the appended claims.

We claim:

1. In combination, means for supporting generally cylindrical containers in upright positions and conveying them seriatim along a horizontal path through a work zone, the containers being randomly arranged in advance of said zone, a series of grippers at each side of said path for holding engagement with diametrically opposed surfaces of the containers, said grippers advancing with and at the same lineal speed as the container supporting and conveying means, and means positioned between the two series of grippers ahead of the work zone for momentarily holding successive containers one at a time out of engagement with the series of grippers at one side of the horizontal path and in firm contact with the other series of grippers, whereby to momentarily decrease the advancing speed of the containers one at a time and allow a preceding container to advance relative to succeeding containers.

2. In a combination as defined in claim 1, the means for holding the containers out of contact with certain grippers, being a device for bodily shifting the containers in a direction transverse to the length of said horizontal path.

3. The combination defined in claim 2 wherein said means is a cam extending along one side of the horizontal path.

4. The combination defined in claim 3 and means yieldingly supporting the cam and urging it into firm engagement with the container.

5. The combination defined in claim 4, and a facing of friction material on the working surface of the cam.

6. The combination defined in claim 1, the means for holding the containers out of contact with certain grippers being a cam extending along one side of the horizontal path inwardly of the container contacting surfaces of the grippers along said one side.

7. The combination defined in claim 6 and a facing of rubber-like material on the working surface of the cam.

8. In combination, means for supporting generally cylindrical containers in upright positions and conveying them seriatim along a horizontal path through a work zone, the containers being randomly arranged in advance of said zone, an endless series of grippers at each side of said path for holding engagement with diametrically opposed surfaces of the containers, said grippers advancing with and at the same lineal speed as the container supporting and conveying means, a fixed cam positioned to shift successive advancing containers transversely of said path away from one series of grippers toward and into firm contact with the other series of grippers whereby to momentarily hold back succeeding containers and decrease the advancing speed of each transversely shifted container below the lineal speed of the preceding previously shifted containers, allowing the preceding containers to advance along said path relative to succeeding containers.

References Cited in the file of this patent
UNITED STATES PATENTS

| | | |
|---|---|---|
| 232,882 | Bennett | Oct. 5, 1880 |
| 1,212,665 | Nordstrom | Jan. 16, 1917 |
| 1,741,752 | Amory | Dec. 31, 1929 |
| 2,679,313 | Gueffroy et al. | May 25, 1954 |